US011660170B2

(12) United States Patent
Navarro

(10) Patent No.: US 11,660,170 B2
(45) Date of Patent: May 30, 2023

(54) METHOD FOR ENSURING FUNCTIONAL OCCLUSION FOR CUSTOMIZED ORTHODONTIC DEVICES

(71) Applicant: Marco Navarro, Dallas, TX (US)

(72) Inventor: Marco Navarro, Dallas, TX (US)

( * ) Notice: Subject to any disclaimer, the term of this patent is extended or adjusted under 35 U.S.C. 154(b) by 421 days.

(21) Appl. No.: 16/875,983

(22) Filed: May 15, 2020

(65) Prior Publication Data

US 2020/0368000 A1    Nov. 26, 2020

Related U.S. Application Data

(60) Provisional application No. 62/848,541, filed on May 15, 2019.

(51) Int. Cl.
*G06T 15/00* (2011.01)
*A61C 9/00* (2006.01)
(Continued)

(52) U.S. Cl.
CPC ............ *A61C 9/0046* (2013.01); *A61C 7/002* (2013.01); *B33Y 80/00* (2014.12); *G06T 17/205* (2013.01); *G06T 2210/41* (2013.01)

(58) Field of Classification Search
CPC ....... A61C 11/00; A61C 9/0046; A61C 7/002; B33Y 80/00; B33Y 50/00; G06T 17/205; G06T 2210/41
(Continued)

(56) References Cited

U.S. PATENT DOCUMENTS 6,579,095 B2 * 6/2003 Marshall .............. A61C 11/001
433/213
8,282,394 B2 * 10/2012 Andrews ................ A61C 11/02
433/54

(Continued)

FOREIGN PATENT DOCUMENTS

| EP | 1549244 B1 * | 6/2012 | ........... A61C 11/001 |
| WO | WO-2021009724 A1 * | 1/2021 | ........... A61C 11/001 |
| WO | WO-2021009733 A1 * | 1/2021 | ............. A61C 7/002 |

OTHER PUBLICATIONS

Martin D, Cocconi R. Orthodontic dental casts: the case for routine articulator mounting. American Journal of Orthodontics and Dentofacial Orthopedics. Jan. 1, 2012;141(1):10.*

(Continued)

*Primary Examiner* — Phu K Nguyen
(74) *Attorney, Agent, or Firm* — Harvey Law, PC; Derrick Harvey

(57) ABSTRACT

The present invention may comprise a method for a treatment plan for orthodontic movement of natural teeth, the method comprising:

Acquiring data of oral anatomy of a patient;
Creating a treatment plan for the patient for orthodontic movement of natural teeth, the end result of the treatment plan for the patient being a 3D model;
Printing out a physical model of 3D model;
Mounting the physical model of the maxillary arch and mandibular arch of the patient's oral anatomy onto a dental articulator to evaluate if at least one of the following exists: 2) if the functional occlusion data of the patient is in centric relation or 2) if malocclusion exists between the maxillary arch and the mandibular arch;
Applying any corrections to the 3D model from the step of determining if malocclusion exists, to create functional occlusion data;

(Continued)

Combining the functional occlusion data with data of the oral anatomy of the patient to create a virtual treatment solution; and Creating orthodontic appliances from the virtual treatment solution.

10 Claims, 14 Drawing Sheets

(51) Int. Cl.
    *A61C 7/00*           (2006.01)
    *B33Y 80/00*        (2015.01)
    *G06T 17/20*        (2006.01)

(58) Field of Classification Search
    USPC .......................................................... 345/418
    See application file for complete search history.

(56) References Cited

U.S. PATENT DOCUMENTS

| | | | | |
|---|---|---|---|---|
| 10,945,818 | B1* | 3/2021 | Motlagh | A61C 7/08 |
| 2002/0008155 | A1* | 1/2002 | Uram | A01G 15/00 |
| | | | | 239/14.1 |
| 2019/0117360 | A1* | 4/2019 | Carlson | A61C 19/052 |
| 2019/0254786 | A1* | 8/2019 | Keating | A61C 13/0004 |
| 2020/0368000 | A1* | 11/2020 | Navarro | A61C 7/002 |

OTHER PUBLICATIONS

Oltramari PV, Conti AC, Navarro RD, Almeida MR, Almeida-Pedrin RR, Ferreira FP. Importance of occlusion aspects in the completion of orthodontic treatment. Brazilian dental journal. 2007;18:78-82.*

Luther F. Orthodontics and the temporomandibular joint: where are we now? Part 2. Functional occlusion, malocclusion, and TMD. The Angle Orthodontist. Aug. 1998;68(4):305-18.*

Rinchuse DJ, Kandasamy S. Orthodontic dental casts: the case against routine articulator mounting. American Journal of Orthodontics and Dentofacial Orthopedics. Jan. 1, 2012;141(1):15.*

Okeson JP. Evolution of occlusion and temporomandibular disorder in orthodontics: Past, present, and future. American Journal of Orthodontics and Dentofacial Orthopedics. May 1, 2015;147(5):S216-23.*

* cited by examiner

METHOD FOR ENSURING FUNCTIONAL OCCLUSION FOR CUSTOMIZED ORTHODONTIC DEVICES

RELATED APPLICATIONS

This application claims priority from U.S. Provisional Application No. 62/848,541 filed on May 15, 2019 and entitled "Improved Method for Ensuring Functional Occlusion for Customized Orthodontic Devices," the entire contents of which are hereby fully incorporated herein.

BACKGROUND OF THE INVENTION

In the field of orthodontics, it is desirable to take pre-operative measurements and take high-quality, accurate impressions. In addition, intra-operative measurements are critical in assessing and predicting the aesthetic and functional outcome of the tooth movement, as well as in the construction of the orthodontic appliances. Specifically, the selection of orthodontic treatment plans and accompanying corrective devices is generally understood to be improved when inputting certain dimensional measurements from the patient's anatomy.

With the advent of digitalization of orthodontics, practitioners are moving towards using imaging to acquire all data utilized to create virtual orthodontic planning and product selection or creation. Existing art solves this by, in piecemeal and optional fashion, checking the TMJ, positioning the jaws properly, looking at facial aesthetics, improving skeletal relationships, and predicting growth.

Some solutions in the arts utilize a 3D recorder for jaw movement, but such approaches fail to address the treatment plan to test the end result functional occlusion of the treatment. Within the industry of sequential clear aligner orthodontic treatment, the rate of aligner corrections and inadequately planned treatment has been problematic for an otherwise advancement of the standard of care and greater comfort of the patient with these aligner treatments.

There exists a need for a method for acquiring patient information for delivering final orthodontic treatment that involves utilizing digital data acquisition and planning without sacrificing functional occlusion of the patient. There further exists a need for current digital orthodontic treatment to have greater input and expertise from the orthodontist. There further exists a need for solutions to better address malocclusion between groups of teeth while applying orthodontic treatments to patients.

FIELD OF THE INVENTION

The present invention relates to fabricating customized orthodontic devices using gnathological concepts. The present invention even further relates to improved methods for taking measurements and capturing data of a dental patient's anatomical features to aid in building orthodontic devices. The present invention even further relates to a comprehensive workflow that reduces the number of patient interactions yet delivers a fully-customized accurate orthodontic treatment plan. The present invention even further relates to using a physical model

SUMMARY OF THE INVENTION

1. In accordance with various aspects of the present invention, the invention may comprise a method for a treatment plan for orthodontic movement of natural teeth, the method comprising acquiring data of oral anatomy of a patient; creating a treatment plan for the patient for orthodontic movement of natural teeth, the end result of the treatment plan for the patient being a 3D model; printing out a physical model of 3D model; mounting the physical model of the maxillary arch and mandibular arch of the patient's oral anatomy onto a dental articulator to evaluate if at least one of the following exists: 2) if the functional occlusion data of the patient is in centric relation or 2) if malocclusion exists between the maxillary arch and the mandibular arch; applying any corrections to the 3D model from the step of determining if malocclusion exists, to create functional occlusion data; combining the functional occlusion data with data of the oral anatomy of the patient to create a virtual treatment solution; and creating orthodontic appliances from the virtual treatment solution, the patient data comprising a 3D mesh of the patient's oral anatomy, with teeth of the patient being separated, and with or without bite registration materials or devices to position the jaw, the invention further comprising determining a maximum interception position to evaluate the patients occlusion, and functional and balancing interferences; the invention further comprising, the orthodontic appliances being selected from the group of customized brackets, lingual I buccal braces, aligners, customized oral devices, corrective oral devices for the patient; the method further comprising reprinting 3D models to evaluate resultant occlusion in an articulation, the method further comprising utilizing a Gnatic replicator to evaluate resultant data. the method further comprising further comprising the steep of determining if malocclusion exists by using a maximum interception position to evaluate at least one of 1) the occlusion of the patient, 2) functional interferences, and 3) balancing interferences; the method further comprising the step of combining the functional occlusion data with data of the oral anatomy o f the patient to create a virtual treatment solution further comprising a solution selected from the group of:

Making the changes manually by changing tooth dimensions, by moving the crowns/roots by centric occlusion or relation;

Taking manual measurement by jig or milimetric rules and recording those changes in computer software program;

Modifying the physical model, then scanning the model and integrating into the virtual treatment solution., the method further comprising working in a software planning workflow whereby a STL file of the 3D model is created after the step of creating a treatment plan;

transferring the STL files to a virtual articulator to evaluate the bite function during virtual mastication and any corrections needed;

Adjusting the 3D model to compensate for any corrections needed; the method further comprising step of Acquiring data of oral anatomy of a patient further comprising one or more steps selected from the group:

Scanning dental models or physical impressions taken of the teeth of the patient;

Acquiring CBCT scan, x-ray, or intraoral scan of the patient's oral anatomy;

Acquiring smile design image of the patient;

Acquiring craniofacial measurements of the skull and teeth of the patient;

BRIEF DESCRIPTION OF THE DRAWINGS

A more complete understanding of the present invention may be derived by referring to the detailed description and claims when considered in connection with the Figures, where like reference numbers refer to similar elements throughout the Figures.

DETAILED DESCRIPTION OF THE INVENTION

Figure 1:
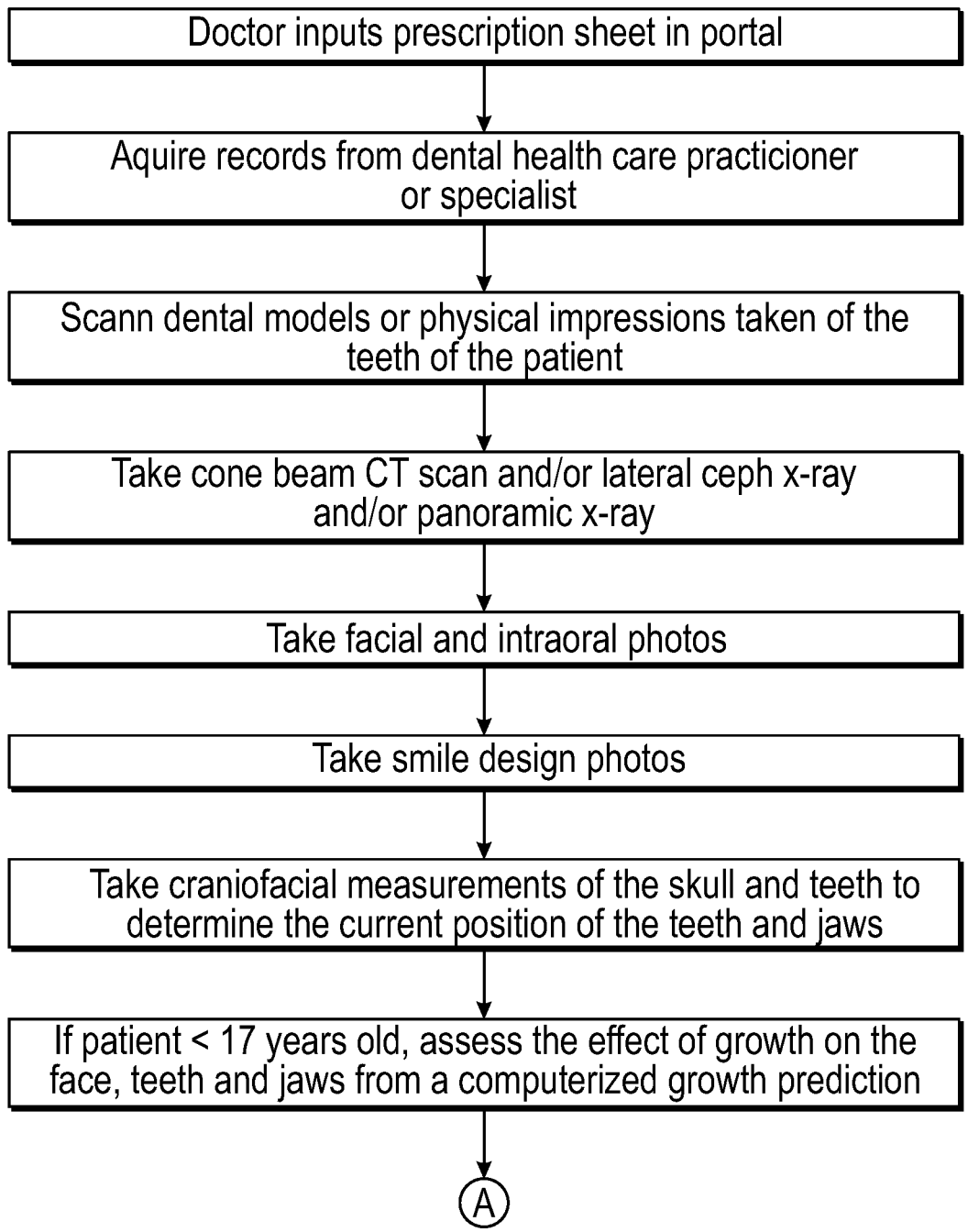
FIG. 1 depicts a flowchart of an inventive process.
Figure 1:
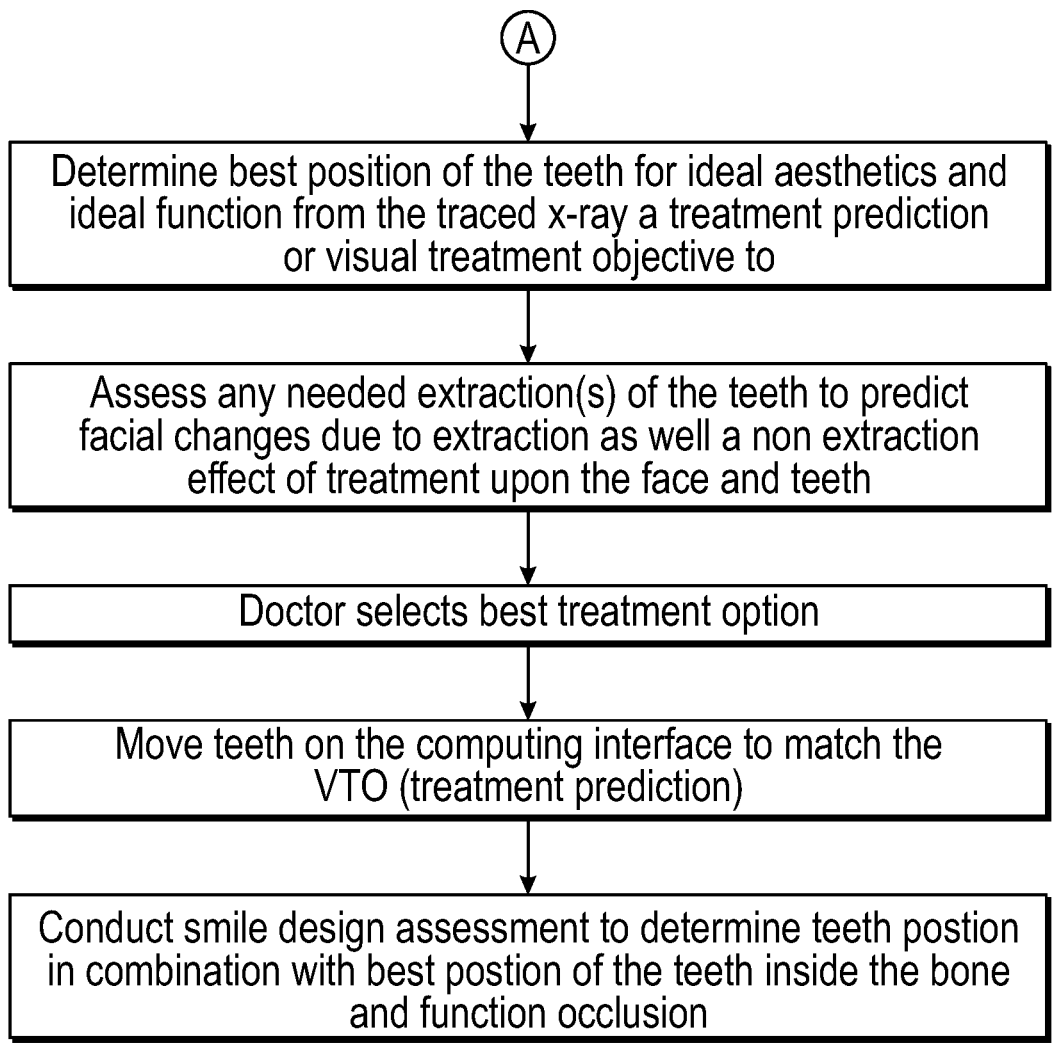
Figure 2:
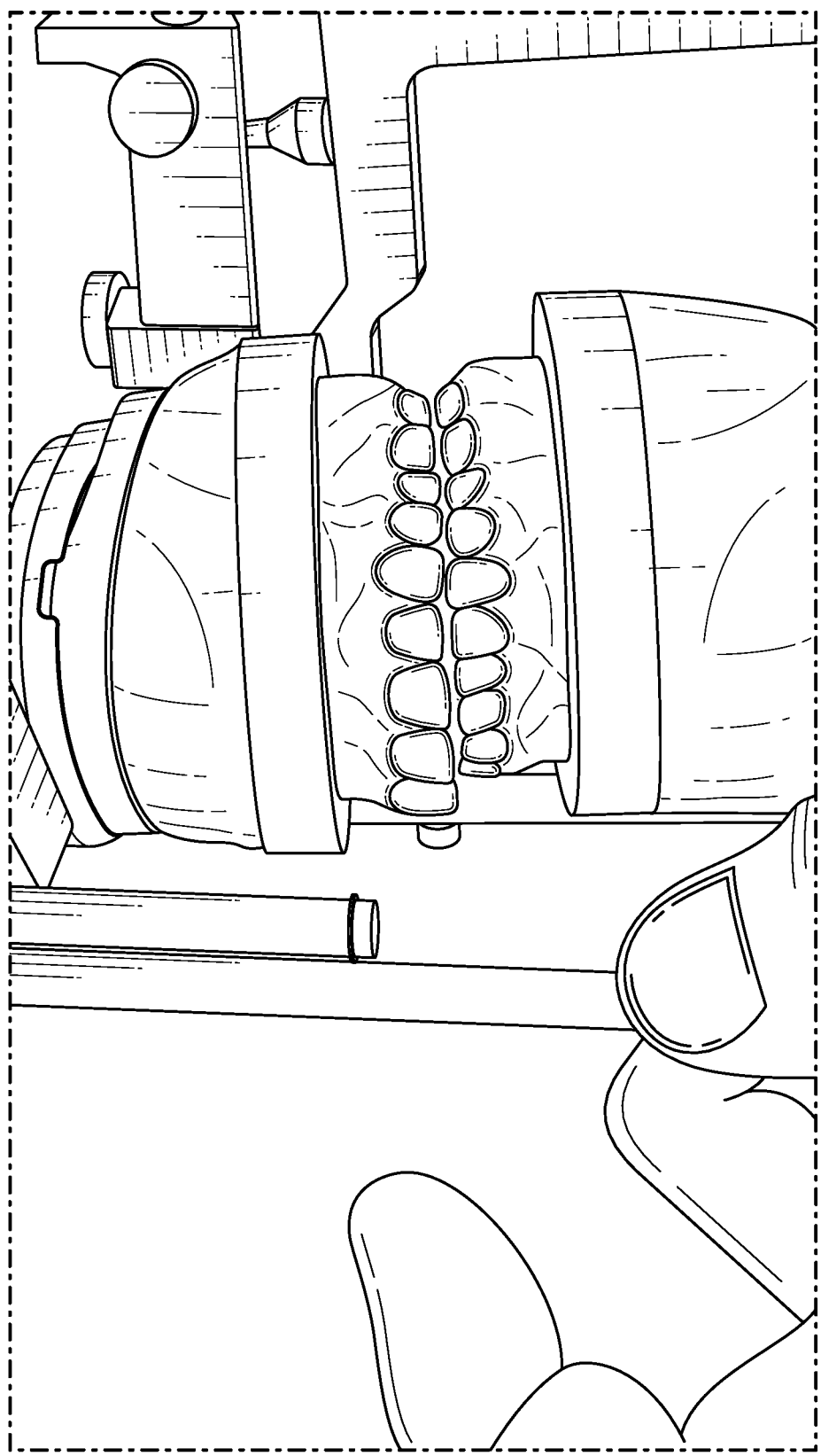
FIG. 2 illustrates a side view of a virtual articulator checking a virtual 3D model.
Figure 3:
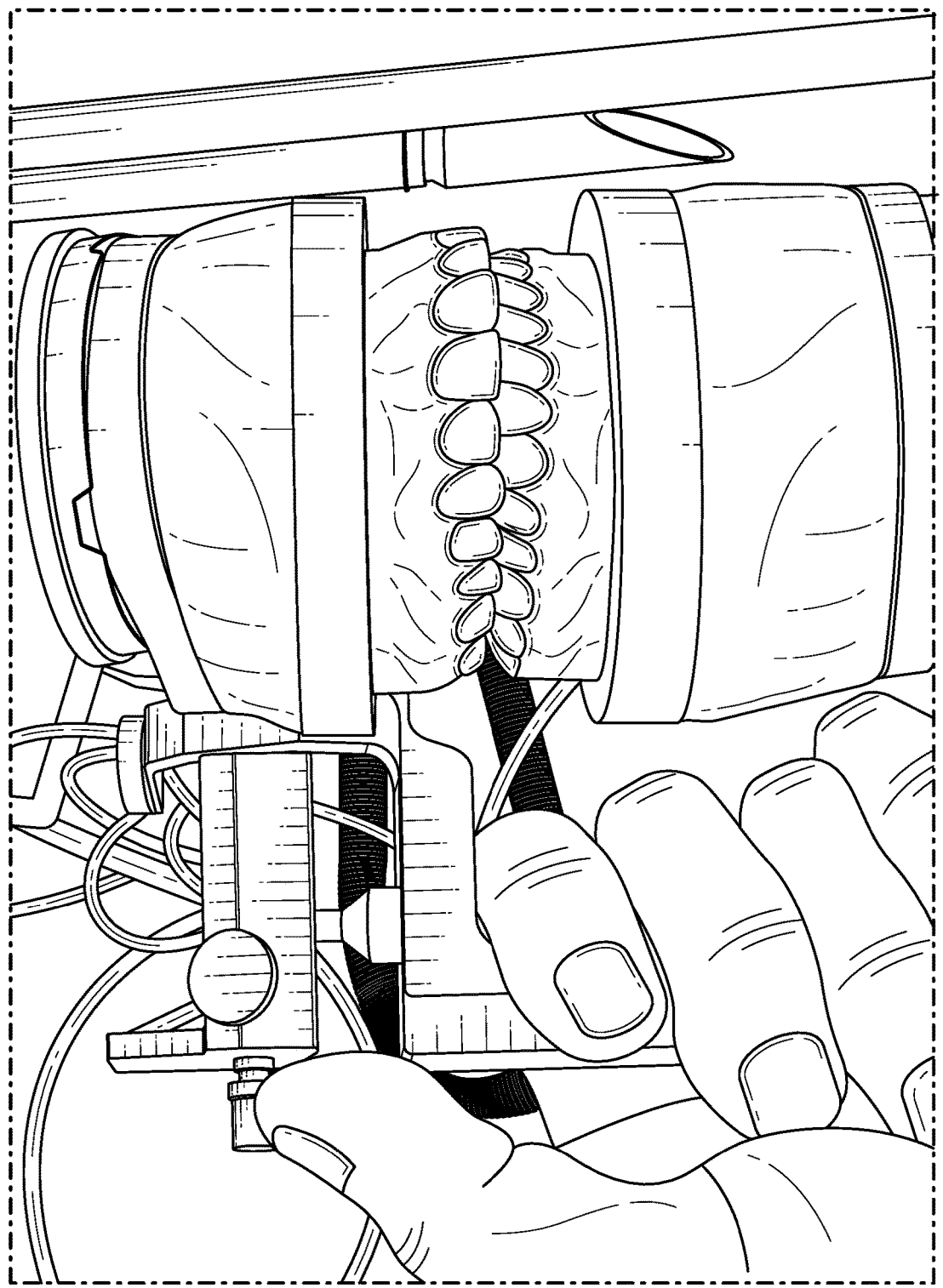
FIG. 3 illustrates a front perspective view of the virtual articulator checking a virtual 3D model
Figure 4:
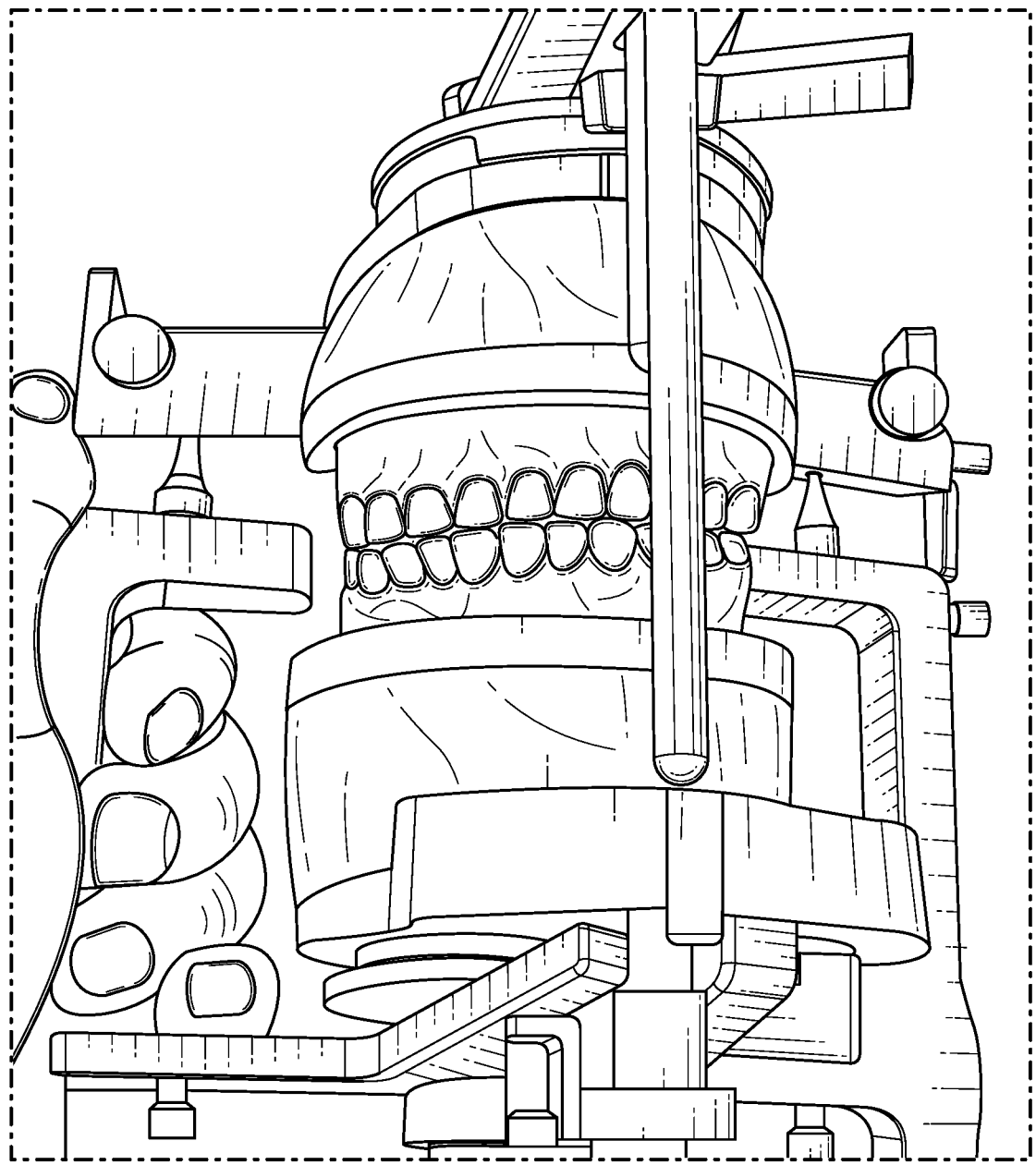
FIG. 4 illustrates a top perspective view of the virtual articulator checking a virtual 3D model in occlusion.
Figure 5:
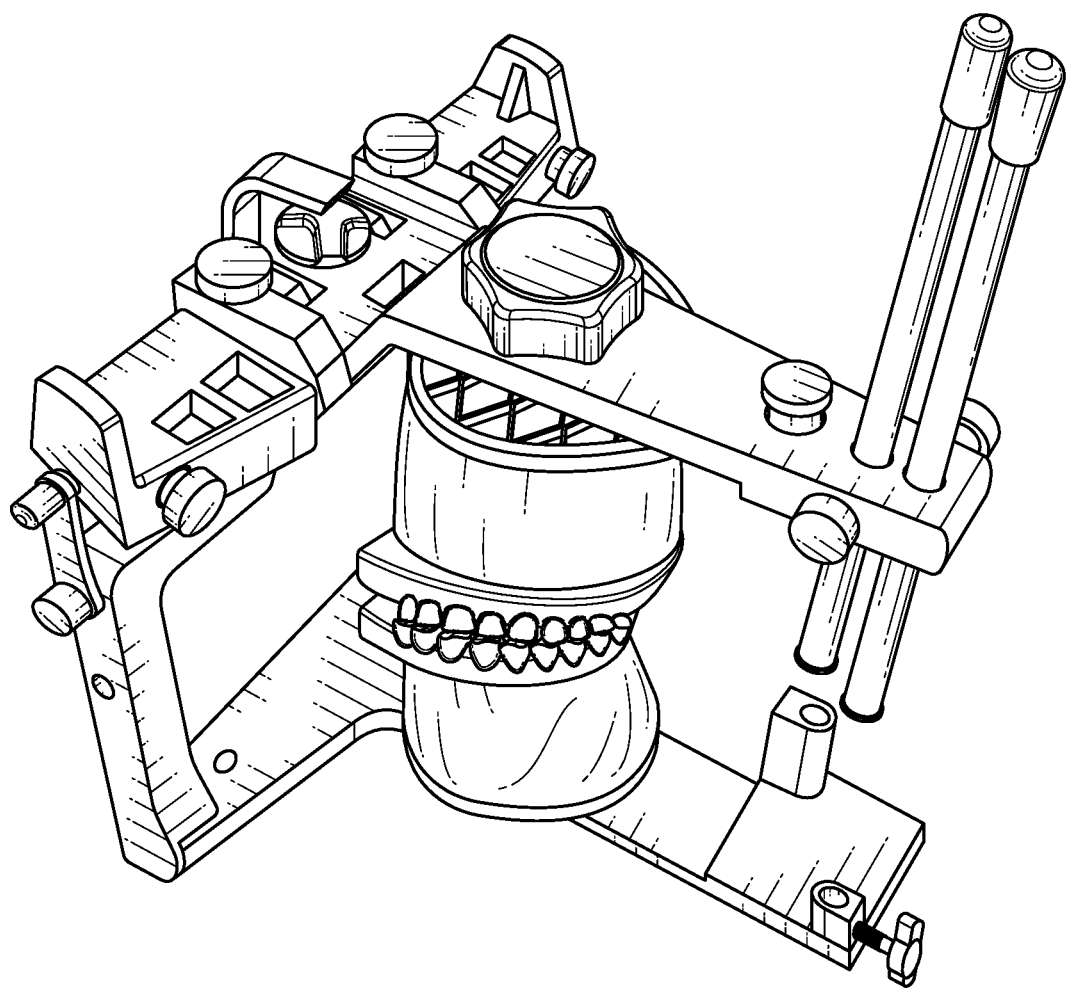
FIG. 5 illustrates a top perspective view of the virtual articulator checking a virtual 3D model in an open position.
Figure 6:
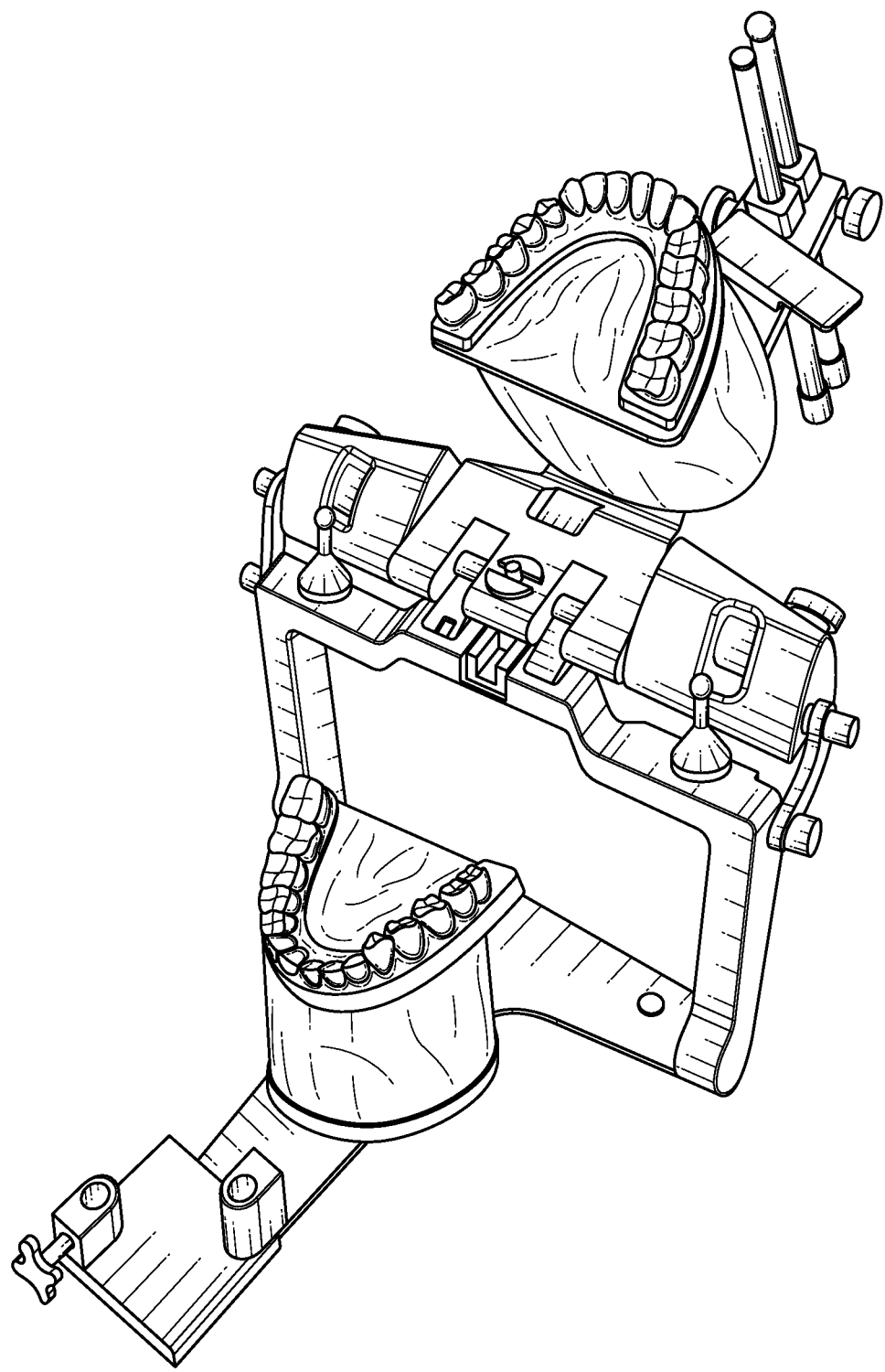
FIG. 6 shows various views of the inventive step of utilizing a physical articulator with the inventive process.
Figure 7:
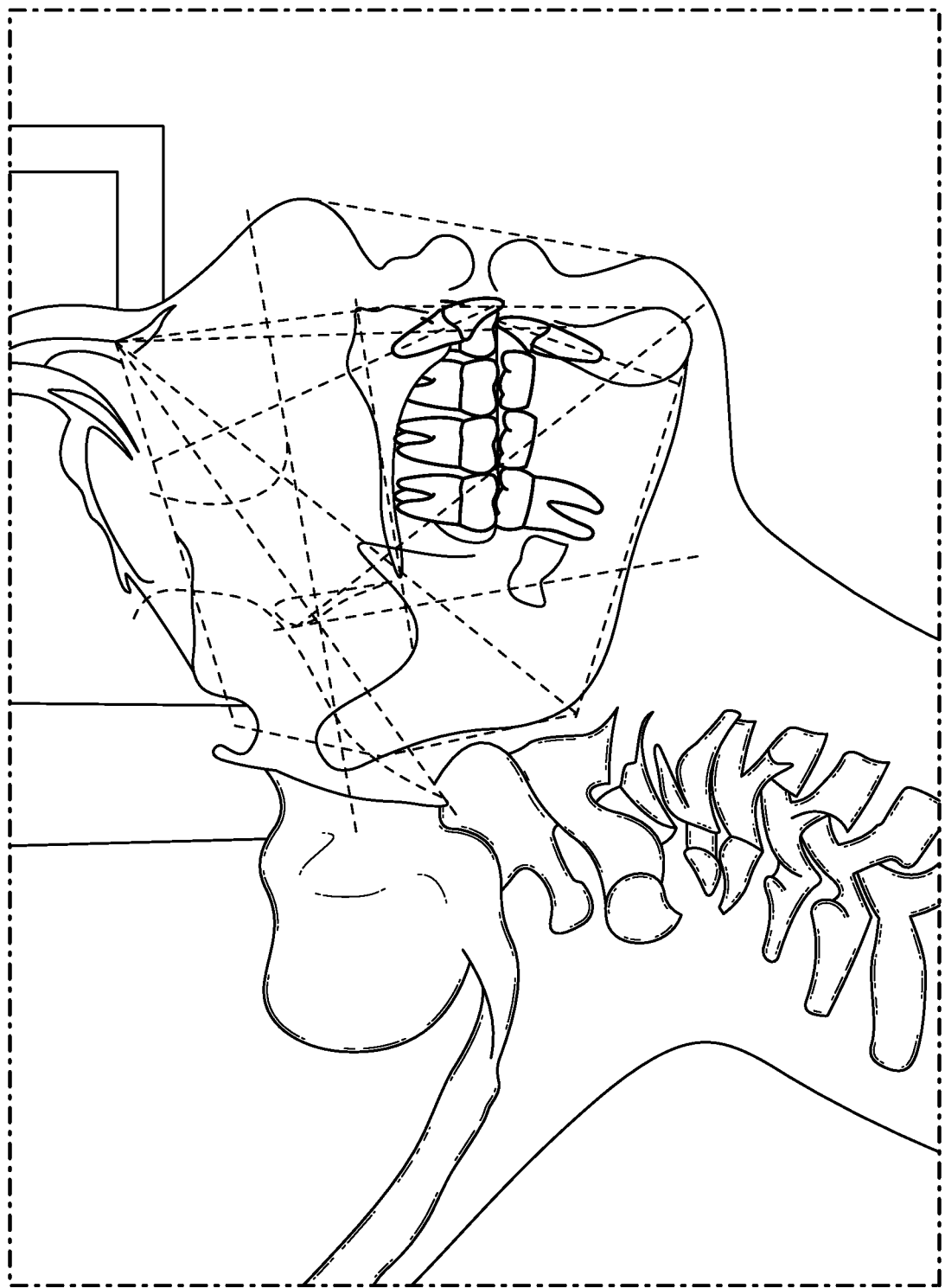
FIG. 7 shows an example of x-ray tracing in the diagnostic phase of the method, according to embodiments of the invention.
Figure 8:
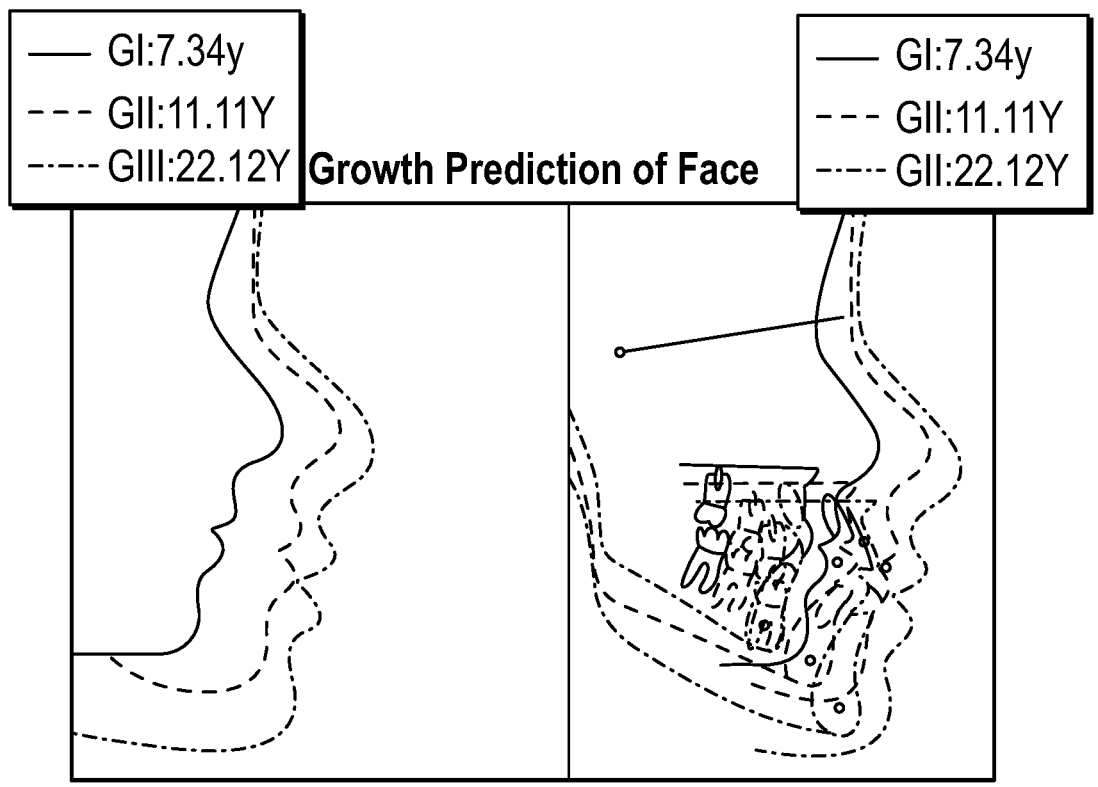
FIG. 8 shows an example of growth prediction of the face in the diagnostic phase of the method, according to embodiments of the invention.
Figure 9:
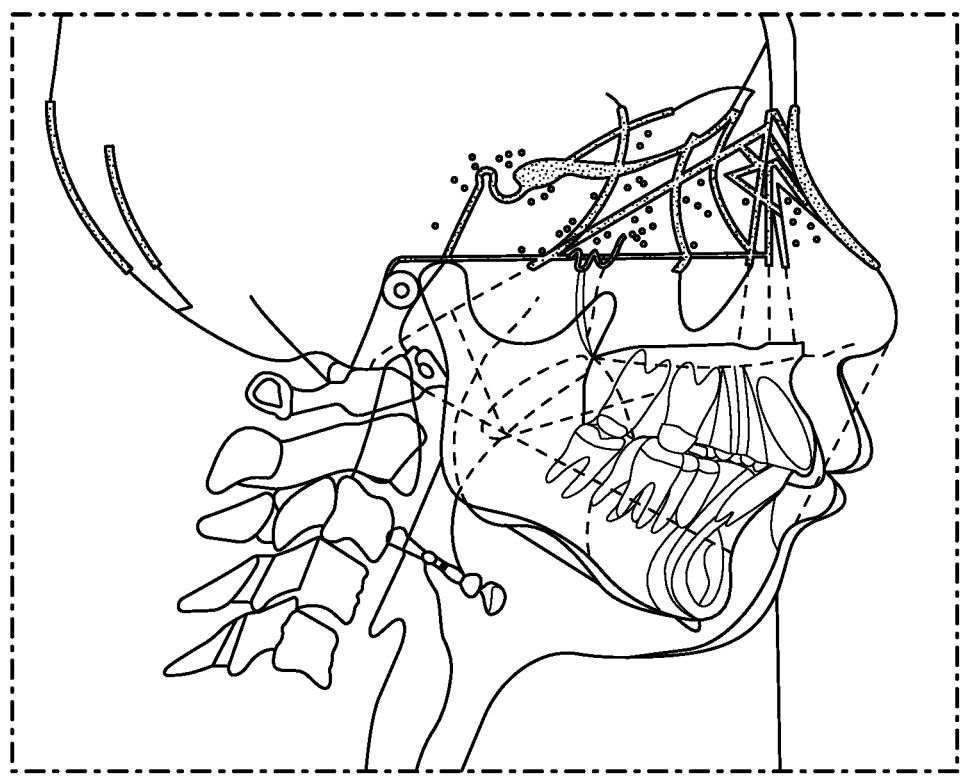
FIG. 9 shows an example of growth prediction of the face and teeth in the diagnostic phase of the method, according to embodiments of the invention.

The present invention may be described herein in terms of various components. It should be appreciated that such components may be realized by any number of structural materials and components configured to perform the specified functions. For example, the present invention may be practiced in any number of orthodontic contexts and the exemplary embodiments relating to treatment plans for the movement of natural teeth while maintaining occlusion functionality are merely a few of the exemplary applications for the invention. For example, the principles, features and methods discussed may be applied to any orthodontic movement or to other medical applications where a functional occlusion should be maintained, such as oral facial surgery.

The present invention may be understood in a first embodiment as a method for producing a real-world model for testing functional occlusion for a digitally-produced (or a hybrid of digital and traditional) treatment plan for orthodontic movement of natural teeth. The invention may add a step for testing out the functional occlusion for a treatment plan by fabricating and testing virtually in jaw replicator in 3D and 4D motions, and inputting any potential malocclusions or other issues with functional occlusion into the existing treatment plan. Such a step is counterintuitive, as it brings an additional physical, real world manufacturing and step within an otherwise virtual treatment planning process. Such an additional step could be seen as an inefficient methodology, using additional material for manufacturing a model, when the industry has moved on to a wholly digital and virtual treatment plan. The present invention adds in a more restorative-focused plan that adds a level of data and that is missing from the advent of wholly digital and virtual treatment plans.

According to embodiments of the invention, a process for producing orthodontic appliances may include variations and combinations of the following steps during an orthodontic diagnostic, planning and treatment plan. The inventive method may comprise initial steps known in the arts or variations thereof. Initially, a doctor may input a prescription sheet in an online portal used during the orthodontic treatment workflow. Another step may comprise acquiring the records of a patient from a dental health care practitioner. Records may take the form of physical measurements or digital data that represent different types of patient imaging. Optionally, the dental professional or other personnel may acquire physical impressions of upper and lower arches or scan with intra oral scanning device to acquire such impressions. By way of example and not limitation, this step may comprise scanning dental models or physical impressions that have been taken of the oral anatomy of the patient, including the teeth, gingiva, and other indicators of tooth root structures and positions, as well as other known anatomical structures known in the industry to inform orthodontic planning and treatment. Another step may comprise taking or acquiring one of more of the following patient imaging data: cone beam CT scan, lateral ceph X-ray, pano ceph x-ray, or others known in the industry to image 2D or 3D images of the patient's oral anatomy. The dental professional or other support or laboratory personnel may acquire patient data from a cone beam or medical CT scanner that comprises a 3D mesh of the patient's oral anatomy, with teeth apart and with or without bite registration materials or devices to position the jaw. Other forms of data representing the oral anatomy of a patient may be utilized within the scope of the invention at this step. In embodiments of the invention, the doctor or technician may acquire or direction the taking of facial and/or intra oral photos take smile design photos and input the resulting data into the orthodontic planning and treatment software. In addition, the doctor or technician may acquire craniofacial measurements of the skull and teeth to determine the position of the patient's teeth and jaws. In an embodiment of the invention, if a patient is without full maturation, for example under the age of 17, the doctor or technician may direct the assessment of the effect of growth of the face, teeth, and jaws from a computerized growth prediction. In another embodiment of the invention, the doctor or technician may determine the best position of the teeth for ideal aesthetics and function from the traced x-ray, a treatment prediction and/or a visual treatment objective to assess any needed extraction(s) of teeth of the patient. In another embodiment of the inventive method, the doctor or technician may select the best treatment option based upon the options available through his software workflow or other treatment workflows. If in a computing interface on a software program, the doctor or technician may move the teeth to match the virtual treatment prediction. The doctor may further conduct the smile design assessment to determine the ideal teeth position, optionally taking into consideration the best position of teeth within the bone and the functional occlusion.

In an embodiment of the invention, an adjustable impression tray may be used as part of a kit, the kit further comprising including a software application (or a code included in a physical kit given to a patient) on a computing device for capturing an existing patient's oral anatomy and data thereof.

In an embodiment of the invention, the dental professional or other personnel such as a technician may print out or otherwise utilize a physical model of patient's oral anatomy based upon the scanned patient data. The dental professional and/or technician may further utilize an anatomical or semi adjustable articulator with the physical model of the patient's oral anatomy to determine and create the patient's functional occlusion data, utilizing the Centric relation. The dental professional or personnel may also determine a maximum interception position to evaluate the patient's occlusion, and functional and balancing interferences, adding to the patient's functional occlusion data. For example, using the articulator, the dental professional or technician may perform all the movements on the articulator to ensure group functional or mutually protected occlusion, and check the patient preference bite relationship. Specifically, the doctor or technician may articulate the arches in movements including A) Left cuspid guidance without working or balancing interferences note only left and upper cuspids engaging in function, B) Anterior guidance without posterior right or left interferences, and C) Right cuspid guidance without working or balancing interferences only right upper and lower cuspids engage without any other teeth touching. Next, the dental professional or technician may combine the functional occlusion data with scanned patient data. This step may take place through conventional planning software (or optionally through manual techniques) known in the arts to create virtual treatment objectives that, based on the objectives, result in an ideal treatment plan.

Looking more closely at FIG. 1, a flowchart outlines a more specific inventive process according to another embodiment of the invention. The first step may comprise a doctor inputting a prescription sheet in a portal. According to embodiments of the invention, this step may entail the beginning of a workflow of an orthodontic treatment of a patient. Next, the process may comprise the step of acquiring the records of a patient from a dental health care practitioner. Then, the process may comprise the step of scanning dental models or physical impressions that have been taken of the oral anatomy of the patient, including the teeth. Next, the process may comprise the step of taking cone beam CT scans and/or a lateral ceph X-ray and/or a pano ceph x ray. Then, the process may include the step of acquiring facial and/or intra oral photos. Next, the process may include the step of taking smile design photos. Then, the process may include the step of taking craniofacial measurements of the skull and teeth to determine the position of the patient's teeth and jaws. Then, the process may include the step of, in the case of a patient without full maturation such as under the age of 17, the assessment of the effect of growth of the face, teeth, and jaws from a computerized growth prediction. Next, the process may include the step of determining the best position of the teeth for ideal aesthetics and function from the traced x-ray, a treatment prediction and/or a visual treatment objective to assess any needed extraction(s) of teeth of the patient. The method illustrated in FIG. 1 may further comprise the step of the doctor or technician selecting the best treatment option based upon the options available through his software workflow or other treatment workflows. If in a computing interface on a software program, the doctor may move the teeth to match the virtual treatment prediction. Then, the process may comprise the step of the doctor or technician conducting the smile design assessment to determine the ideal teeth position, optionally taking into consideration the best position of teeth within the bone and the functional occlusion.

Figure 10:
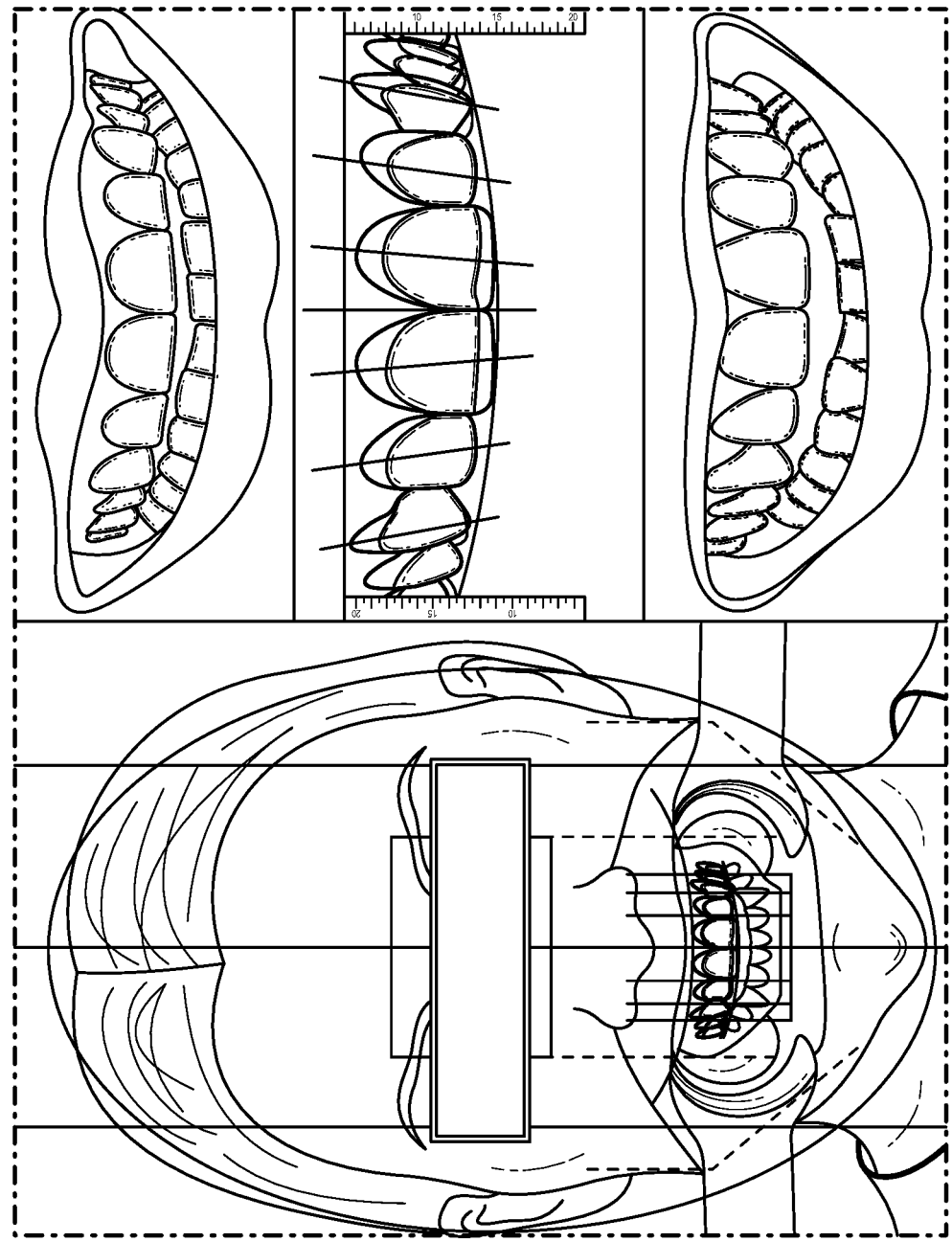
FIG. 10 shows an example of digital smile design, according to embodiments of the invention.
Figure 11:
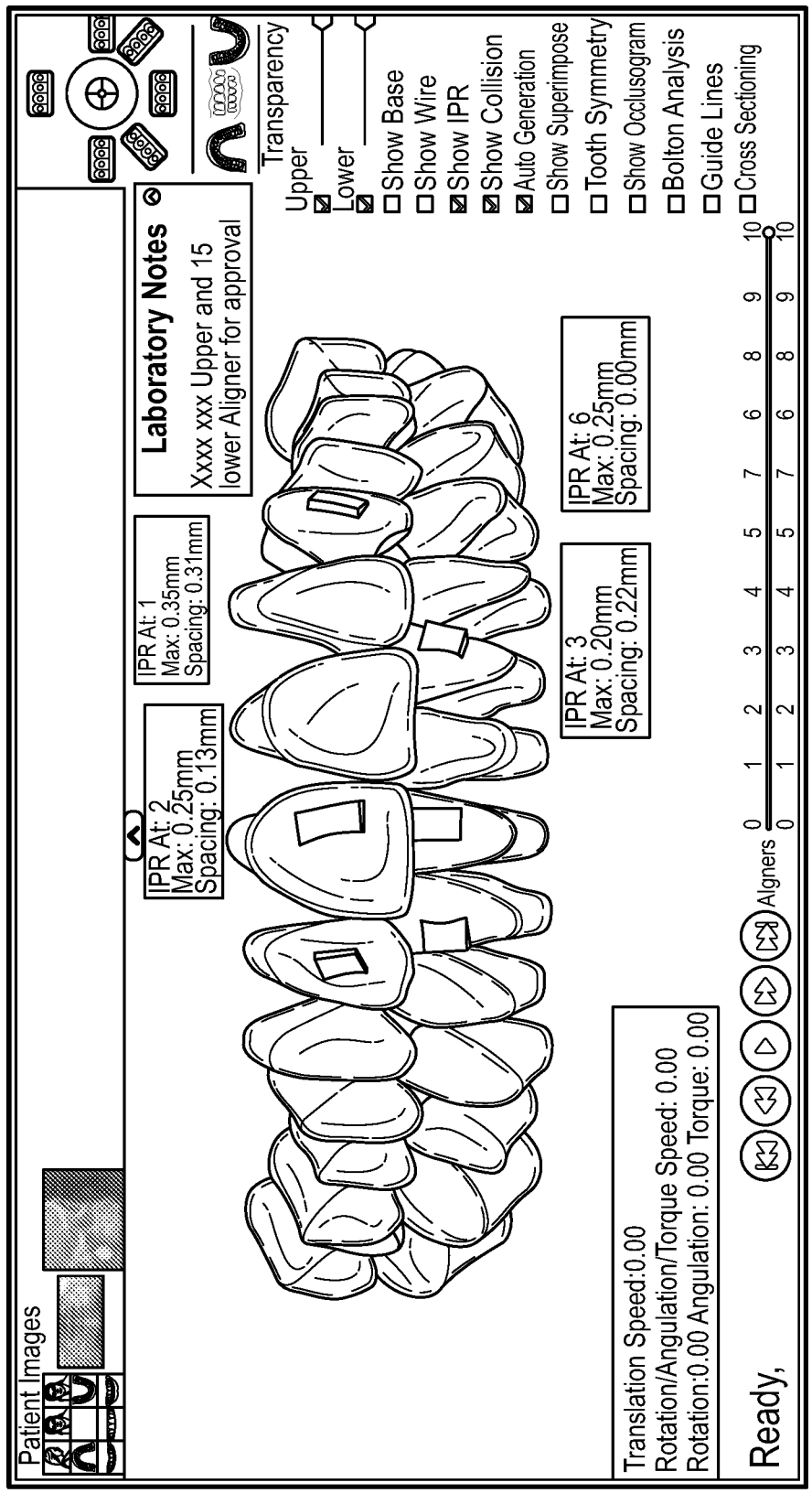
FIG. 11 shows an example of treatment planning according to embodiments of the invention.
Figure 12:
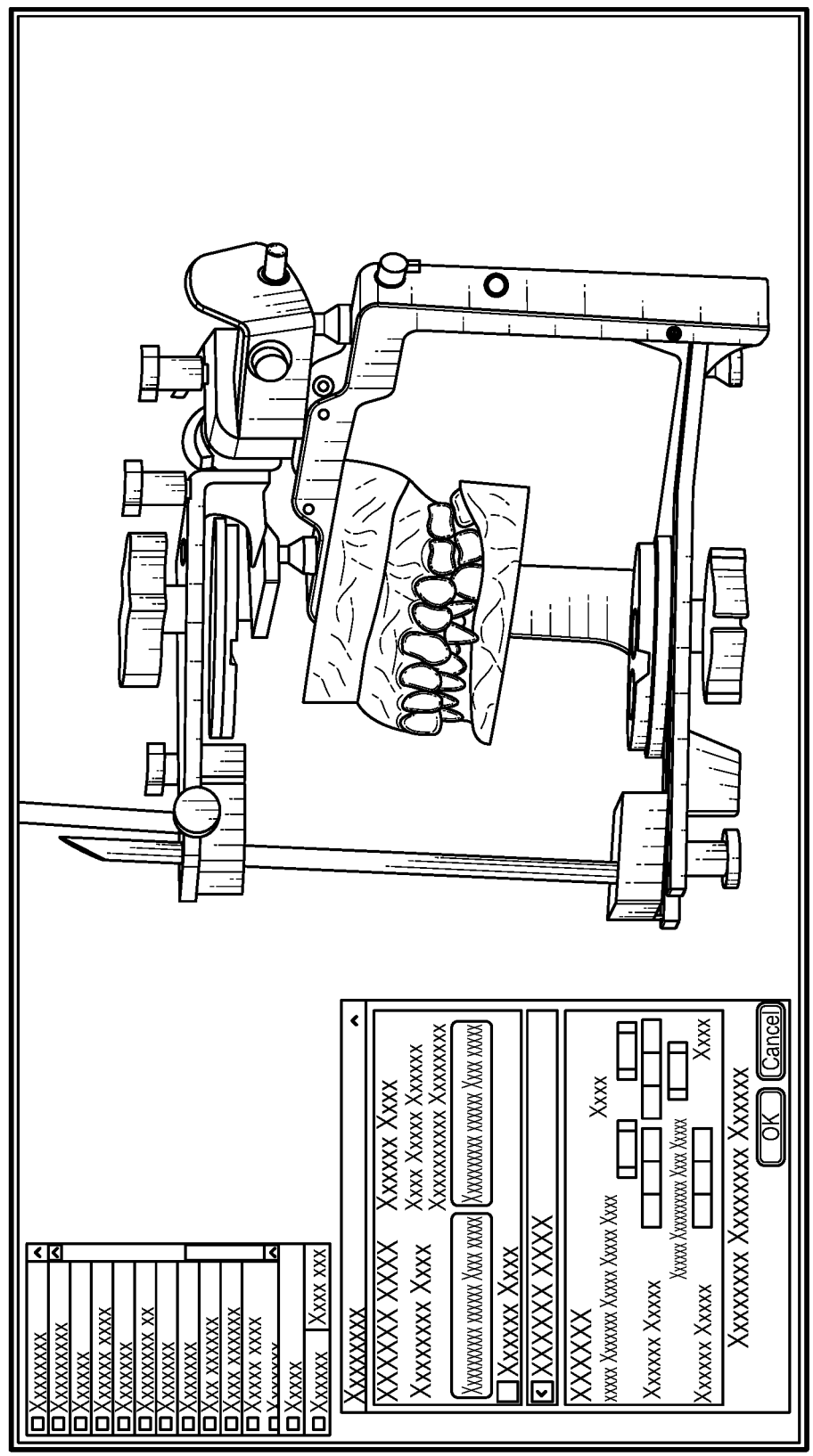
FIG. 12 illustrates a virtual articulator utilizing 4D jaw motion from a CBCT scanner according to embodiments of the invention.
Figure 13:
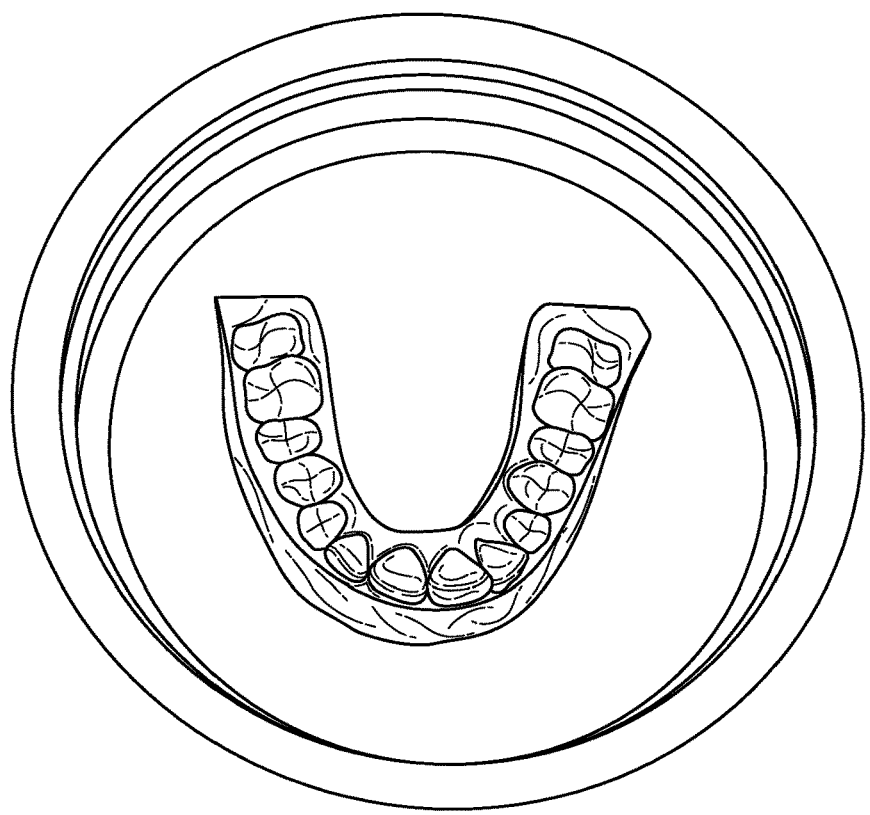
FIG. 13 illustrates an example of aligner fabrication according to embodiments of the invention.
Figure 14:
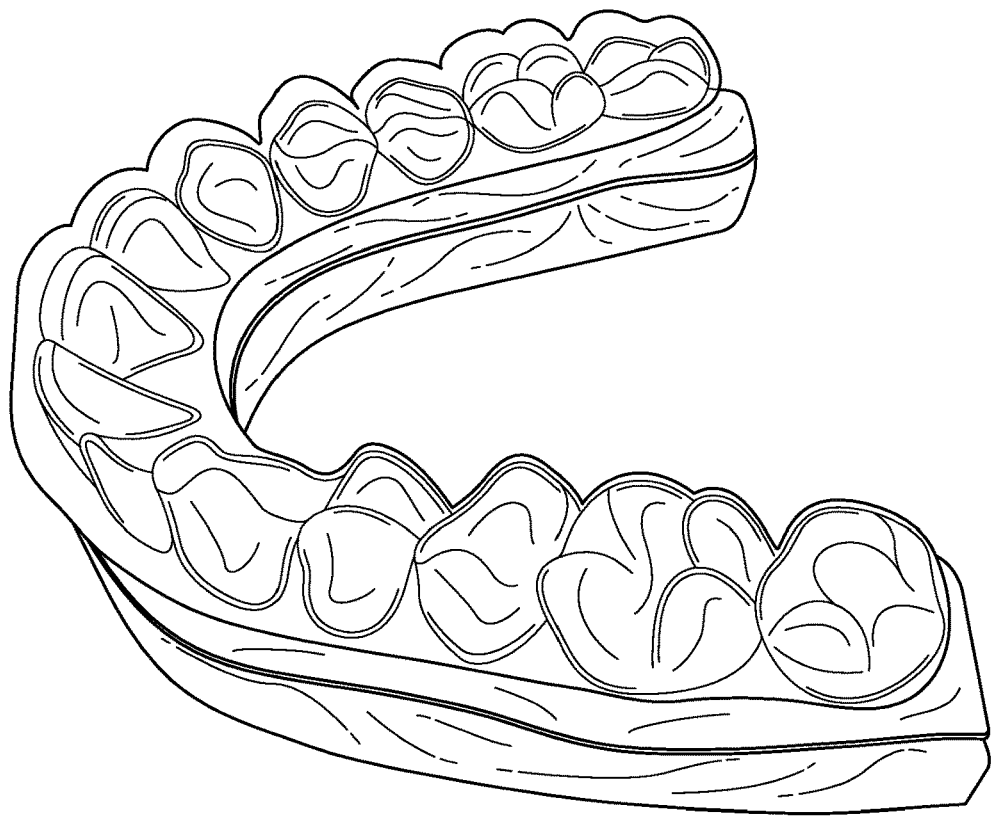
FIG. 14 illustrates an example of aligners trimming and cleaning according to embodiments of the invention.
Figure 15:
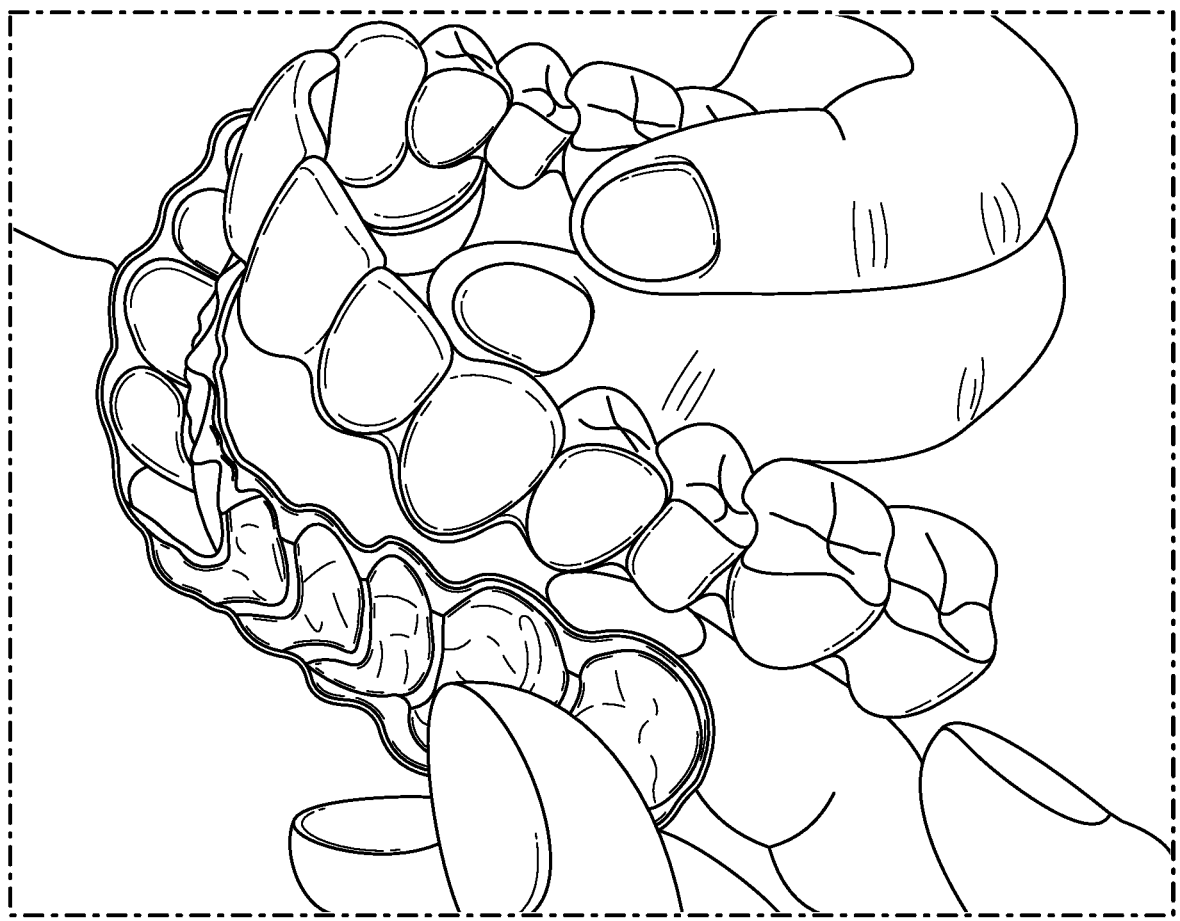
FIG. 15 illustrates a clear aligner manufactured according to embodiments of the inventive method.

According to embodiments of the invention seen in FIG. 10, the method for producing orthodontic appliances may further comprise a functional evaluation step. After the treatment planning has been finalized, if the doctor or technician is working in a software planning workflow a finalized version of the STL files of the treatment may be transferred to a virtual articulator to evaluate the function of the bite, if the bite needs correction to achieve a mutually protected occlusion or tooth group function then the teeth on the 3D models may be adjusted and tested again to ensure ideal function of the teeth during mastication. In other embodiments, virtual articulator may include a 4D jaw replicators that have captured jaw motion by CBCT or other imaging methods known in the arts as seen in FIG. 10 to achieve ideal tooth position and function. Final 3D models may represent the patient's ultimate corrected oral anatomy, according to an embodiment of the invention.

According to FIGS. 2-6, the inventive method for producing orthodontic appliances may further comprise a step of creating physical models of the final 3D model of the patient. Physical models may be printed or manufactured according to methods known in the arts of creating models by additive milling model construction. The physical 3D model may be mounted in a physical articulator to take a physical assessment of the patient's bite and functional occlusion. A physical articulator is a mechanical device used in dentistry to which casts of the maxillary and mandibular teeth are fixed, reproducing recorded positions of the mandible in relation to the maxilla. The physical model may be mounted on the articulator to check for malocclusion, TMJ/TMD issues, and other problems with functional occlusion of the patient. This step allows the doctor or technician to correct the bite where the teeth, jaw, muscle, and bones are working towards a functional harmony. If the doctor or technician finds that the patient's bite has no malocclusion or other issues, then the models are ready for construction along with appliances that the doctor chooses for orthodontic treatment.

In an embodiment of the invention, the doctor may find the following issues in the physical assessment of the patient's bite. If the functional occlusal examination results in poor anterior guidance, then the dental professional or personnel may optionally add the following inputs into the treatment plans, depending upon the preferred technology or workflow:

1) Make the changes manually by changing tooth dimensions, by moving the crowns/roots by centric occlusion or relation;

2) By manual measurement by jig, or utilizing milimetric rules and recording those changes in the virtual treatment planning software or manual treatment plan; or by 3) By modifying the model itself: The doctor or technician may fabricate veneer or adding wax or otherwise changing the teeth in the physical model to improve function/aesthetics. Then the dental professional or personnel may scan model and use in digital design phase.

Using the treatment plan, the dental professional or personnel may create customized brackets lingual and buccal braces, aligners or other customized oral devices for the patient. In another embodiment of the invention, to create a personalized bracket prescription, the dental professional may use a virtual treatment option to move teeth. Technicians may move the crowns and roots to get a better idea of the facial aesthetics. In other embodiments of the invention, dental professionals or personnel may reprint 3D models to evaluate resultant occlusion in an articulation as well as digitally prior to fabrication of appliances the appliances. Further, the dental professional may optionally utilize a Gnatic replicator to evaluate resultant data.

Benefits, other advantages, and solutions to problems have been described herein with regards to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims.

What is claimed is:

1. A method for a treatment plan for orthodontic movement of natural teeth, the method comprising:
   Acquiring data of oral anatomy of a patient;
   Creating a treatment plan for the patient for orthodontic movement of natural teeth, the end result of the treatment plan for the patient being a 3D model;
   Printing out a physical model of 3D model;
   Mounting the physical model of the maxillary arch and mandibular arch of the patient's oral anatomy onto a dental articulator to evaluate if at least one of the following exists: 1) if the functional occlusion data of the patient is in centric relation or 2) if malocclusion exists between the maxillary arch and the mandibular arch;
   Applying any corrections to the 3D model from the step of determining if malocclusion exists, to create functional occlusion data;
   Combining the functional occlusion data with data of the oral anatomy of the patient to create a virtual treatment solution; and
   Creating orthodontic appliances from the virtual treatment solution.

2. The method of claim 1, the patient data comprising a 3D mesh of the patient's oral anatomy, with teeth of the patient being separated, and with or without bite registration materials or devices to position the jaw.

3. The method of claim 1 further comprising determining a maximum interception position to evaluate the patients occlusion, and functional and balancing interferences.

4. The method of claim 1, the orthodontic appliances being selected from the group of
   customized brackets, lingual I buccal braces, aligners, customized oral devices, corrective oral devices for the patient.

5. The method of claim 1 further comprising reprinting 3D models to evaluate resultant occlusion in an articulation.

6. The method of claim 1 further comprising utilizing a Gnatic replicator to evaluate resultant data.

7. The method of claim 1, further comprising the steep of determining if malocclusion exists by using amaximuminterception position to evaluate at least one of 1) the occlusion of the patient, 2) functional interferences, and 3) balancing interferences.

8. The method of claim 1, the step of combining the functional occlusion data with data of the oral anatomy of the patient to create a virtual treatment solution further comprising a solution selected from the group of:
   Making the changes manually by changing tooth dimensions, by moving the crowns/roots by centric occlusion or relation;
   Taking manual measurement by jig or milimetric rules and recording those changes in computer software program;
   Modifying the physical model, then scanning the model and integrating into the virtual treatment solution.

9. The method of claim 1 further comprising working in a software planning workflow whereby a STL file of the 3D model is created after the step of creating a treatment plan;
   transferring the STL files to a virtual articulator to evaluate the bite function during virtual mastication and any corrections needed;
   Adjusting the 3D model to compensate for any corrections needed.

10. The method of claim 1, the step of Acquiring data of oral anatomy of a patient further comprising one or more steps selected from the group:
    Scanning dental models or physical impressions taken of the teeth of the patient;
    Acquiring CBCT scan, x-ray, or intraoral scan of the patient's oral anatomy;
    Acquiring smile design image of the patient;
    Acquiring craniofacial measurements of the skull and teeth of the patient.

* * * * *